(12) United States Patent
Graeffe et al.

(10) Patent No.: US 6,743,338 B2
(45) Date of Patent: Jun. 1, 2004

(54) METHOD AND MEASURING DEVICE FOR MEASURING AT LEAST ONE PROPERTY OF MOVING WEB

(75) Inventors: Jussi Graeffe, Kyröskoski (FI); Timo Saikanmäki, Tampere (FI); Mauri Ojala, Tampere (FI); Jari Koivu, Tampere (FI); Hannu Moisio, Kangasala (FI)

(73) Assignee: Metso Automation Oy, Helsinki (FI)

( * ) Notice: Subject to any disclaimer, the term of this patent is extended or adjusted under 35 U.S.C. 154(b) by 0 days.

(21) Appl. No.: 10/187,584

(22) Filed: Jul. 2, 2002

(65) Prior Publication Data

US 2003/0024301 A1 Feb. 6, 2003

(30) Foreign Application Priority Data

Jul. 3, 2001 (FI) .............................................. 20011447

(51) Int. Cl.[7] .......................... D21F 7/00; G01B 13/04; G01B 15/02; G01B 121/04
(52) U.S. Cl. ................. 162/198; 162/263; 162/DIG. 6; 73/37.7; 73/73; 73/159
(58) Field of Search ................................. 162/198, 263, 162/192, 199, 272, 262, 252, DIG. 6; 324/229–231, 635, 644, 662, 694, 716; 73/37.7, 38, 159, 73; 700/127–129; 702/170–172; 250/559.19, 559.27, 339.1; 356/485, 803, 804, 630, 908, 402, 429, 243.5

(56) References Cited

U.S. PATENT DOCUMENTS

| | | | | |
|---|---|---|---|---|
| 3,617,872 A | * | 11/1971 | Horn et al. | 324/261 |
| 3,718,037 A | * | 2/1973 | Stringer et al. | 73/862.454 |
| 3,818,327 A | | 6/1974 | Alexander | |
| 3,827,808 A | | 8/1974 | Cho | |
| 3,855,524 A | | 12/1974 | Crawford | |
| 4,246,775 A | * | 1/1981 | Stultz | 73/38 |
| 4,311,037 A | * | 1/1982 | Gotchel et al. | 73/38 |
| 4,449,398 A | * | 5/1984 | Williams | 73/159 |
| 4,929,895 A | * | 5/1990 | Typpo | 324/231 |
| 5,722,285 A | * | 3/1998 | Tsuchiya et al. | 73/159 |
| 5,918,376 A | | 7/1999 | Syré et al. | |
| 6,280,573 B1 | * | 8/2001 | Lindsay et al. | 162/198 |

FOREIGN PATENT DOCUMENTS

| | | |
|---|---|---|
| DE | 199 3 928 A1 | 9/2000 |
| DE | 19913928 | 9/2000 |
| EP | 0 389 265 A2 | 9/1990 |
| WO | WO 00/37885 | 6/2000 |

OTHER PUBLICATIONS

European Search Report, European Patent Application No. 02014650.2, Completed Nov. 6, 2003.

* cited by examiner

Primary Examiner—Peter Chin
Assistant Examiner—Eric Hug
(74) Attorney, Agent, or Firm—Alston & Bird LLP

(57) ABSTRACT

The measuring device comprises at least one measuring head having a reference part, which comprises a reference surface against which the moving web is supported. The reference surface comprises a measuring area in the inside of which the property of the web is measured. The reference part is arranged in connection with the measuring head in such a way that below the reference part, there is a substantially open air space. The measuring head comprises means for generating negative pressure in the air space below the reference part, and the reference part comprises holes formed through it, in such a way that the negative pressure generated in the air space affects through the reference part the space between the reference surface and the moving web in such a way that the web is supported against the reference surface substantially over the whole area of the measuring area.

32 Claims, 4 Drawing Sheets

METHOD AND MEASURING DEVICE FOR MEASURING AT LEAST ONE PROPERTY OF MOVING WEB

BACKGROUND OF INVENTION

1) Field of the Invention

The invention relates to a method of measuring at least one property of a moving web, in which method the property of the moving web is measured by means of a measuring device having at least one measuring head with a reference part, the reference part having a reference surface against which the moving web is supported to measure the property of the web.

Further, the invention relates to a measuring device for measuring at least one property of a moving web, the measuring device having at least one measuring head with a reference part, the reference part having a reference surface against which the moving web is arranged to be supported to measure the property of the web.

2) Description of Related Art

In paper manufacture, quality properties of paper, such as the thickness of the paper or another property, are typically measured in a continuous manner when a paper web is moving in a paper machine. Usually, measurement of the quality properties of paper is performed by what are called traversing measuring devices, in which the actual measuring detectors or sensors are arranged at measuring heads on the opposite sides of the paper web, the measuring heads, in turn, being arranged in measuring carriages traveling in the cross direction of the paper web over the whole width of the paper web. There is a narrow slot, i.e. an air gap, between the measuring carriages, where the paper web travels at high speed. The measuring devices can, however, be positioned fixedly, whereby they measure the same point in the cross direction of the paper web all the time.

In modern paper manufacture, there are very high requirements for measuring methods of the thickness of paper, in particular. For example, the thickness of the web manufactured with a newsprint machine is typically about 70 $\mu$m, and the external measuring accuracy that is the aim of the measurement is below 1 $\mu$m. The measuring accuracy to be aimed at may even be 0.3 $\mu$m. Techniques used for measuring the thickness of paper are typically based on utilization of electromagnetism, optics or a combination thereof. In measuring devices utilizing optics, it is very important to keep the paper as straight and even as possible during the measurement; the aim is to guarantee this by bringing the web to the immediate vicinity of the measuring head, or even into contact with the measuring head, in which case the surface of the measuring head or a reference part arranged therein, being in contact with the web, forms the reference surface for the measurement. However, present solutions have the problem of the web vibrating at high frequencies when the paper moves forwards at a high speed, which vibration proceeds in the web to the measuring point of the thickness of the web, so that the web does not stay in contact with the reference surface at the measuring point, which leads to inaccurate measurement.

FI publication 973 448 discloses a measuring device based on electromagnetism, used for measurement of the thickness of a moving matter, such as a paper web, the device comprising a sliding panel against which the moving matter is supported for the measurement. There is/are one or more grooves machined as far as to the edge of the sliding panel in the direction of travel of the moving matter on the surface of the sliding panel. The grooves are machined in such a way that the width of the grooves increases as one moves towards the edge of the sliding panel. Further, there are channels machined on the sliding panel which supply pressurized air to the grooves from their narrower end, whereby negative pressure is generated between the sliding panel and the moving matter due to the effect of the pressurized air and the grooves, which negative pressure draws the moving matter against the sliding panel. The thickness of the moving matter can be determined by means of the distance between a measuring coil arranged on the sliding panel and a measuring probe arranged on the opposite side of the web relative to the measuring coil and the sliding panel. The problem in the solution disclosed in the publication is that when the moving matter is a thin paper web, for instance, the web easily vibrates when moving at a high speed, and blisters and bends due to the effect of the negative pressure in the grooves, whereby the web is easily lifted up from the reference surface formed by the sliding panel, and thus the measuring accuracy of the measuring device is weakened.

DE publication 19 913 928 discloses a measuring device for determining properties of a moving web and particularly the thickness of a moving paper web. The measuring device comprises an upper part arranged above the web, which upper part is kept at a distance from the upper surface of the web in such a way that it does not touch the web. Further, the measuring device comprises a lower part arranged below the web, which lower part is kept in contact with the lower surface of the web by means of the suction effect created by the design of the upper surface of the lower part and by the airflows caused by the air carried along the moving web, and possibly in addition, by means of special support means. The lower part of the measuring device can be brought in contact with the web also thanks to blow and suction effects directed at the web. According to an embodiment of the measuring device disclosed in the publication, the upper part of the measuring device comprises measuring means based on electromagnetism and optics for determining the distance between the upper and the lower parts of the measuring device and the distance between the upper part of the measuring device and the upper surface of the web and thus for determining the thickness of the web. In the solution disclosed in the publication, using air carried along the web to guarantee the contact between the lower part of the measuring device and the web is problematic, for example when the speed of travel of the moving web varies. Further, blisters may be formed in the moving web due to the design of the upper surface of the lower part of the measuring device and the effect of the negative pressure generated by the air carried along the web in such a way that the web can at some points be lifted up from the reference surface formed by the lower part of the measuring device, which weakens the measuring accuracy of the measuring device.

BRIEF SUMMARY OF THE INVENTION

An object of the present invention is to provide a new type of solution to support a moving web against a reference part in a measuring device.

A method according to the invention is characterized by the reference surface comprising a measuring area, from the inside of which measuring area the property of the web is measured, and negative pressure being generated between the moving web and the reference surface through the reference part in such a way that the negative pressure affects the moving web in the direction of the web level at different distances from the measuring area in such a way that due to the effect of the negative pressure, the moving web is supported against the reference surface substantially over the whole area of the measuring area.

Further, the measuring device according to the invention is characterized in that the reference surface comprises a measuring area, from the inside of which measuring area the property of the web is arranged to be measured, and that the reference part is arranged in connection with the measuring head in such a way that below the reference part, there is a substantially open air space, and that the measuring head comprises means for generating negative pressure in the air space below the reference part, and that the reference part comprises holes formed through it at different distances from the measuring area in such a way that the negative pressure to be generated in the air space is arranged to affect, through the holes formed through the reference part, between the reference surface and the moving web in such a way that due to the effect of the negative pressure, the moving web is supported against the reference surface substantially over the whole area of the measuring area.

According to an essential idea of the invention, at least one property of the moving web is measured by means of a measuring device having at least one measuring head with a reference part, the reference part having a reference surface against which the moving web is supported to measure the property of the web. Further, according to an essential idea, the reference surface comprises a measuring area, from the inside of which measuring area the property of the web is measured, and that negative pressure is generated through the reference part between the moving web and the reference surface in such a way that due to the effect of the negative pressure, the moving web is supported against the reference surface substantially over the whole area of the measuring area. According to a preferred embodiment of the invention, the reference part is arranged in connection with the measuring head in such a way that below the reference part, there is a substantially open air space, and that the measuring head comprises means for generating negative pressure in the air space below the reference part, and that the reference part comprises holes formed through it, in such a way that the negative pressure to be generated in the air space is arranged to affect between the reference surface and the moving web through the holes formed through the reference part in such a way that due to the effect of the negative pressure, the moving web is supported against the reference surface substantially over the whole area of the measuring area. According to a second preferred embodiment of the invention, the measuring head comprises at least one channel that is in connection with the open air space below the reference part, whereby the negative pressure is generated in the air space by supplying a gaseous medium between the measuring head and the moving web. According to a third preferred embodiment of the invention, the lower surface of the reference part comprises two air channels substantially parallel relative to the direction of travel of the moving web for supplying a gaseous medium between the measuring head and the moving web substantially in parallel with the direction of travel of the moving web. According to a fourth preferred embodiment of the invention, the negative pressure between the reference surface and the moving web is arranged to be somewhat below the ambient pressure, typically 80 to 99% of the ambient pressure. According to a fifth preferred embodiment of the invention, the measuring device comprises a first measuring head and a second measuring head, between which there is an air gap where the moving web is arranged to travel, the reference part being arranged at the second measuring head. According to a sixth preferred embodiment of the invention, the first measuring head comprises both at least one electromagnetic measuring means for determining the distance between the first measuring head and the reference part at the second measuring head and at least one optical measuring means for determining the distance between the first measuring head and the web supported against the reference surface.

By means of the solution according to the invention, the moving web can be supported against the measuring area on the reference surface of the reference part in such a way that the web stays supported against the reference surface in the measuring area, despite vibrations generated while it moves, owing to which the property of the web can be measured very accurately. When the reference part is arranged in connection with the measuring head in such a way that there is a substantially open air gap below the reference part, and when holes extending through the reference part have been formed in the reference part, it is easy to generate negative pressure between the web and the reference surface by means of the negative pressure generated in the air gap. By supplying a gaseous medium between the web and the measuring head from a channel that is in connection with the air gap below the reference part, negative pressure can be generated in the air gap in a simple and easy manner. When a gaseous medium is supplied to the space between the measuring head and the moving web only in parallel with the direction of travel of the moving web, only a small amount of gas is required to provide sufficient negative pressure between the web and the reference surface. When the measuring device comprises a first measuring head and a second measuring head between which there is an air gap in which the moving web travels, and when the first measuring head comprises means for determining the distance between the first measuring head and the reference part arranged at the second reference head and means for determining the distance between the first measuring head and the web supported against the reference surface, it is easy to measure the thickness of the moving web at the accuracy of less than one micrometer.

In the present description, the term 'paper' refers, in addition to paper, also to board, tissue and pulp.

BRIEF DESCRIPTION OF THE SEVERAL VIEWS OF THE DRAWINGS

The invention will be explained in more detail in the attached drawings, of which.

DETAILED DESCRIPTION OF THE INVENTION

Figure 1:
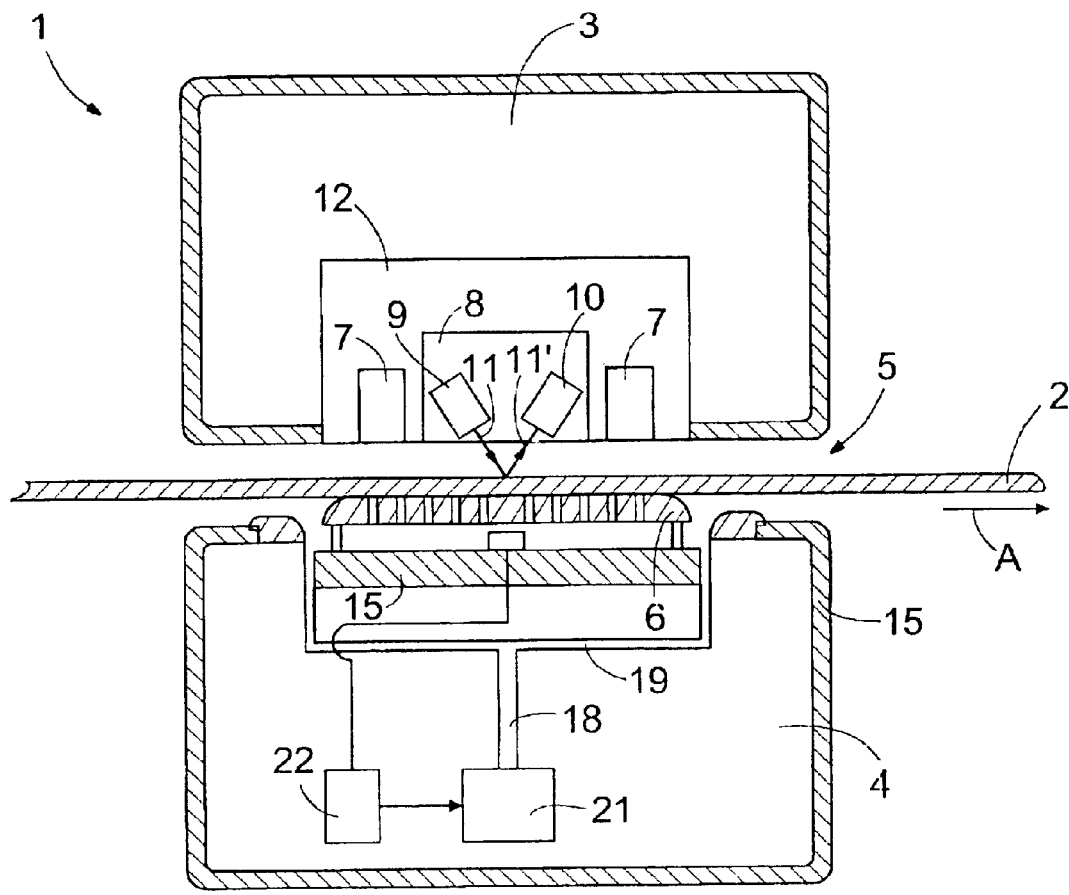
FIG. 1 schematically illustrates a side view and a cross-section of a measuring device according to the invention.

FIG. 1 shows schematically a cross-section of a measuring device 1 according to the invention, which is in the figure arranged to measure the thickness of a paper web 2 moving in the direction of an arrow A. For the sake of clarity, the paper web 2 is in FIG. 1 shown as being essentially thicker than it is in reality. The measuring device 1 comprises a first measuring head 3 and a second measuring head 4, between which there is an air gap 5 where the paper web 2 moves at a high speed. Typically, the first measuring head 3 and the second measuring head 4 are arranged in measuring carriages moving in the measuring frame extending over the whole width of the paper web 2 in such a way that the first measuring head 3 and the second measuring head 4 move forwards and backwards, in other words traverse, over the whole width of the web to be produced, whereby the measuring device 1 measures the thickness of the paper web 2 substantially continuously. For the sake of clarity, the measuring frame and the measuring carriages are not shown in FIG. 1. The first measuring head 3 and the second measuring head 4 can also be fixedly arranged in connection with the paper machine, whereby they measure the thickness of the paper web 2 only at one point in the cross-direction of the paper web 2.

In order to measure the thickness of the paper web 2, there are measuring means based on both electromagnetism and optics arranged in connection with the first measuring head 3 and a reference part 6 arranged in connection with the second measuring head 4, against which reference part the paper web 2 is supported and which reference part simultaneously forms a reference surface for measurement. Preferably, the reference part 6 is plate-like, as shown in FIG. 1, but the appearance of the reference part 6 can also vary. The measuring means based on electromagnetism can be for instance a coil 7, which is shown in a very schematic manner in FIG. 1. The reference part 6, in turn, is made of a material that conducts electricity well, for instance of steel, aluminum or copper, whereby the distance between the coil 7 and the reference part 6 can be determined in a manner known per se to a person skilled in the art. The reference part 6 can also be merely coated with a material that conducts electricity well, whereby the reference part 6 can be made of a large variety of different materials. The measuring means based on optics can be for instance a laser 8 comprising a transmitter part 9 for transmitting a measuring beam 11 towards the paper web 2 and a receiver part 10 for receiving a measuring beam 11 reflected from the surface of the paper web 2. The measuring means based on electromagnetism determine the distance between the first measuring head 3 and the second measuring head 4, and the measuring means based on optics determine the distance between the first measuring head 3 and the paper web 2, whereby the thickness of the paper web 2 can be determined by subtracting the distance between the first measuring head 3 and the paper web 2 from the distance between the measuring heads 3 and 4. The coils 7 and the laser 8 are both arranged in the support element 12, which is fixedly arranged in connection with the first measuring head 3. Further, the measuring head 1 comprises control means for controlling the operation of the coils 7 and the laser 8, and an analyzing apparatus for processing the measurement information of the coils 7 and the laser 8, the control means and the analyzing apparatus not being shown in FIG. 1 for the sake of clarity.

In measuring devices utilizing optics for measuring the thickness of a moving web, it is very important to keep the moving web at the measuring moment as straight and even as possible; the aim is to guarantee this by supporting the moving web against the reference surface in the measuring device. When the web moves forwards at a high speed, high-frequency vibrations are generated in the web, which vibrations proceed in the web and tend to detach the web from the reference surface, whereby the measuring accuracy is weakened.

Figure 2:
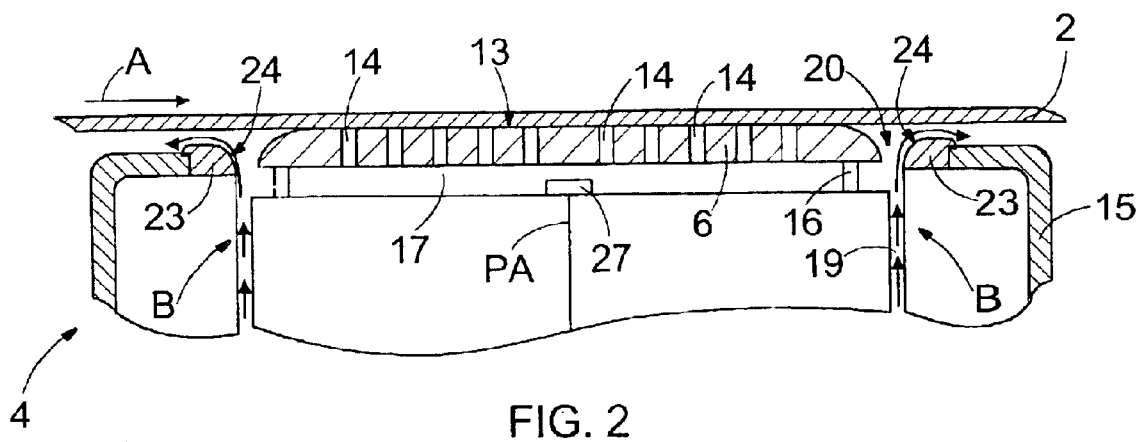
FIG. 2 schematically illustrates a side view and a cross-section of the measuring head of the measuring device of FIG. 1.
Figure 3:
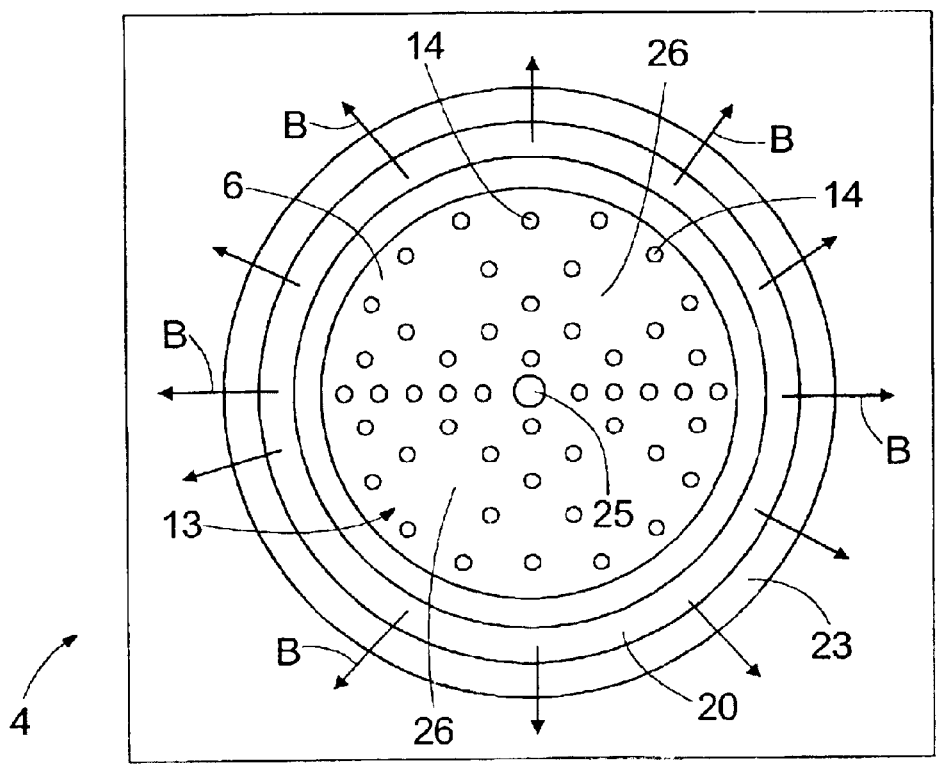
FIG. 3 schematically illustrates a top view of the measuring head of FIG. 2.

In the measuring device according to FIG. 1, this drawback has been corrected in a way shown in more detail in FIGS. 2 and 3. FIG. 2 shows a side view and a cross-section of the second measuring head 4, and, compared with FIG. 1, enlarged, FIG. 3 showing schematically a top view of the second measuring head 4, in other words seen from the direction of the paper web 2. The reference part 6, the upper surface of which forms the reference surface 13 for measuring the thickness of the paper web 2, is provided with several holes 14 extending through the reference part 6. The reference part 6 is supported against a frame structure 15 of the second measuring head with one or more support elements 16 in such a way that there remains an open air space 17 below the reference part 6. Further, the measuring head 4 comprises a feed channel 18, a flow channel 19 and a nozzle opening 20 for supplying a pressurized gaseous medium between the second measuring head 4 and the paper web 2, and means, for example a blower 21 and a blower control unit 22 used to control it, for supplying gas into the feed channel 18. For the sake of clarity, FIG. 1 does not show valves used in the supply of gas. The gas to be supplied is preferably air but it can also be other gas. The gas to be supplied into the feed channel 18 flows from the feed channel 18 to the nozzle opening 20 via the flow channel 19. In the embodiment according to FIG. 1, the flow channel 19 is annular, as is the nozzle opening 20. The nozzle opening 20 is surrounded by a curved control surface 24, whereby the nozzle opening 20 and the curved control surface 24 form some type of a Coanda nozzle. From the nozzle opening 20, the gas is discharged towards the paper web 2, and the curved control surface 24 positioned in the immediate vicinity of the nozzle opening 20 turns the gas flow to the space between the paper web 2 and the second measuring head 4. Thus, the gas flows in accordance with arrows B. The pressure of the gas and thus its flow rate is arranged to be so high that the gas flow provides negative pressure between the paper web 2 and the second measuring head 4, which negative pressure draws the paper web 2 towards the second measuring head 4. The negative pressure generated by the effect of the Coanda nozzle affects the air space 17 and further between the reference surface 13 and the paper web 2 at the point of the reference part 6 via the holes 14 formed through the reference part 6 in such a way that the paper web 2 is supported against the upper surface of the reference part 6, i.e. the reference surface 13, due to the effect of the negative pressure. The curved control surface 24 can be formed in the frame structure 15 of the second measuring head 4 surrounding the nozzle opening 20 or in a form element 23 arranged around the nozzle opening 20, as shown in the figures.

The holes 14 formed through the reference part 6 are positioned in the reference part 6 in such a way that the moving paper web 2 places itself straight and even against the measuring area 25 on the measuring surface 13. The measuring area 25 is the area where the distance between the first measuring head 3 and the moving paper web 2 is measured for instance by means of the measuring beam 11 of the laser 8 described above. The diameter of the measuring area 25 is preferably about 2 mm, but it can also vary.

The hole pattern formed by the holes 14 in the reference part 6 can also vary in a plurality of ways. In the solutions of the figures, the holes 14 are positioned at different distances in the direction of the web level, i.e. both closer to and further away from the measuring area 25, and in different directions from the measuring area 25. In the direction of travel of the web, there are holes 14 both before the measuring area 25 and after the measuring area 25. Also in the cross-direction of the web, there are holes 14 on both sides of the measuring area 25. When the holes 14 of the reference part 6 are positioned in said manner, the moving paper web places itself in a very straight and even manner against the reference surface 13 and particularly the measuring area 25. The proportion of the open portion of the reference surface 13 formed by the holes to the closed portion can vary, as can the size of the cross-section of the holes. The holes 14 are dimensioned in such a way that they are sufficiently great to allow dust or other impurities carried along the paper web 2 to pass through but sufficiently small so that the paper web 2 supported against the reference surface 13 does not blister or crease, but that it places itself evenly against the reference surface 13 and particularly the measuring area 25. The hole pattern formed in the reference part 6 can be implemented in such a way that there remains for induction measurement at least one such measuring surface 26 on the reference surface 13 that does not contain holes 14. In the case of FIG. 3, the reference part 6 comprises four measuring surfaces 26, and by arranging at the first measuring head 3 four coils 7 or four other measuring means based on electromagnetism against the measuring surfaces 26 at corresponding points it becomes possible to compensate changes in the position between the reference plate 6 and the first measuring head 3 or the support element 12 away from the measurement. Naturally, it is obvious that for determination of the distance between the reference surface 13 of the reference part 6 and the first measuring part 3, as many coils 7 as is suitable for each particular case are used, for instance only one coil 7, whereby the measuring area 25 can preferably be used as the measuring surface 26.

By means of the present solution, the moving paper web 2 can be supported against the reference surface 13 in such a way that the vibrations generated in the web cannot detach the web from the reference surface 13 in the measuring area 25. The web cannot blister or crease in other ways either, but it stays supported against the reference surface 13 in the area of the measuring area 25, whereby the measurement easily achieves the measuring accuracy of below one micrometer. By forming four such measuring surfaces 26 on the reference surface 13 where there are no holes, and by providing the first measuring head 3 with four coils 7, the accuracy of the measurement can be further improved by compensating the position changes between the first measuring head 3 and the reference surface 6 away from the measurement results. However, the same end result is achieved by measuring the distance between the first measuring head 3 and the reference surface 13 at the point of the measuring area 25. Further, by selecting the size of the cross-section of the holes 14 in such a way that dust or other impurities carried along the paper web 2 can pass, due to the effect of the negative pressure, through the holes 14 to the air space 17 below the reference part 6, and further to the space between the paper web 2 and the second measuring head 4, and still further out of the measuring device 1 along the web, preventing thus the second measuring head 4 from getting dirty, whereby the cleaning measures directed at the second measuring head 4 can be omitted as being unnecessary, or at least, the interval between the cleaning measures can be made longer.

The feed pressure of the gas to be supplied between the moving paper web 2 and the second measuring head 4 can vary depending for example on the speed, tension, type and basis weight of the paper web 2. The flow rate of the gas can be changed by means of a blower 21, for instance, which is guided with a blower control unit 22. A negative-pressure sensor 27 that measures the negative pressure prevailing in the air space 17 can also be arranged in the air space 17, which sensor gives measurement information PA on the negative pressure, by means of which information the blower control unit 22 can control the operation of the blower 21. The pressure difference that has to be formed between the reference surface 13 and the air space 17 to support the paper web 2 against the reference surface 13 is very small. Even the pressure that is about one percent smaller in the air space 17 compared with the pressure between the reference surface 13 and the paper web 2 is sufficient to support the web against the reference surface 13 without vibration or blistering. Depending on the speed, basis weight, type and tension of the paper web 2, the pressure difference typically varies between 1% and 20%, but it can also be smaller or greater. The smaller the pressure difference, the less dust carried along the web goes through the holes 14.

Figure 4:
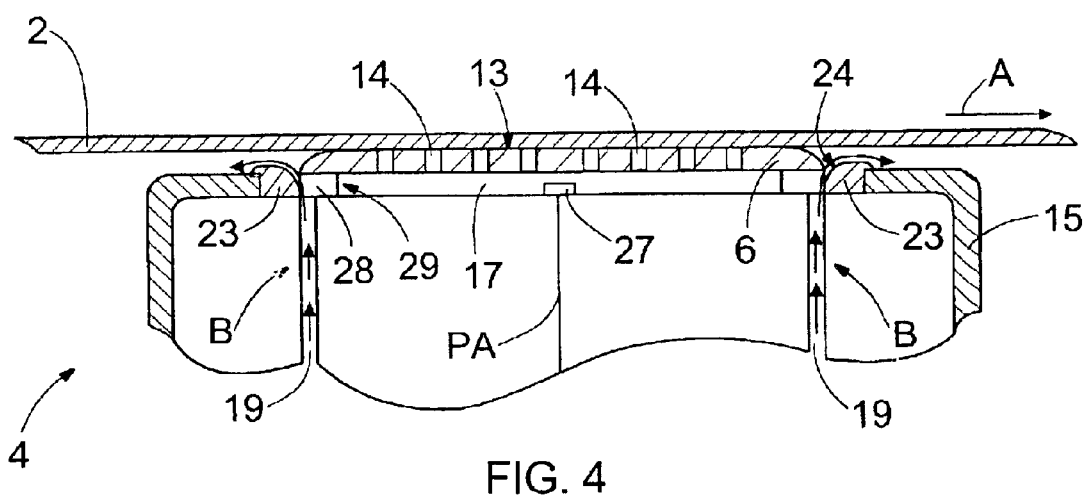
FIG. 4 schematically illustrates a side view and a cross-section of the measuring head of a second measuring device according to the invention.
Figure 5:
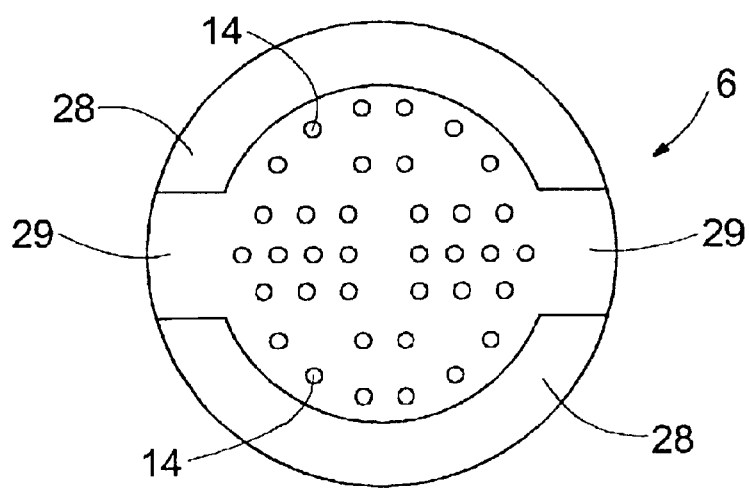
FIG. 5 schematically illustrates a bottom view of the reference part of the measuring head according to FIG. 4.

FIGS. 4 and 5 show a second embodiment of the second measuring device 1, FIG. 4 illustrating a side view and a cross-section of the second measuring head 4 and FIG. 5 illustrating a bottom view of the reference part 6. On the lower surface of the reference part 6, at the edges thereof, elevations 28 have been formed in such a way that two air channels 29 remain between the elevations 28 in the direction of travel of the paper web 2. When the reference part 6 is positioned in its place at the second measuring head 4, the elevations 28 prevent the gaseous medium from flowing to the space between the paper web 2 and the second measuring head 4 from somewhere else than through the air channels 29 in the way shown by arrows B. By means of this solution, the amount of gas to be supplied to the space between the paper web 2 and the second measuring head 4 can be reduced, achieving at the same time sufficient negative pressure between the reference surface 13 and the paper web 2 through the holes 14 to support the web smoothly against the reference surface 13.

Figure 6:
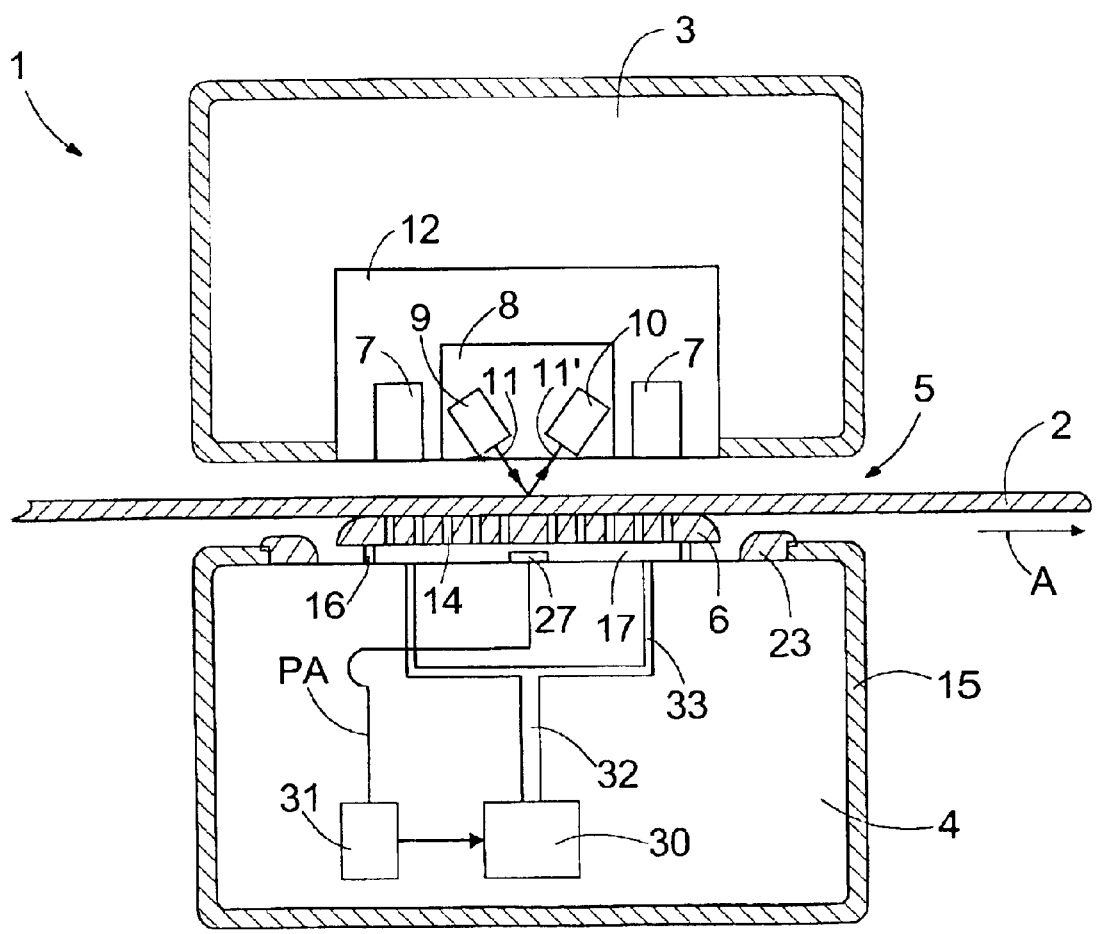
FIG. 6 schematically illustrates a side view and a cross-section of a third measuring device according to the invention.

FIG. 6 schematically shows a side view and a cross-section of a third measuring device 1 according to the invention. The measuring device 1 of FIG. 6 comprises a vacuum pump 30 with a control unit 31, by means of which negative pressure can be generated in the air space 17 via channels 32 and 33 and further between the reference surface 13 and the paper web 2 through the holes 14 of the reference part 6 in such a way that the paper web 2 is supported against the reference surface 13 at least over the area of the measuring area 25 on the reference surface 13.

Figure 7:
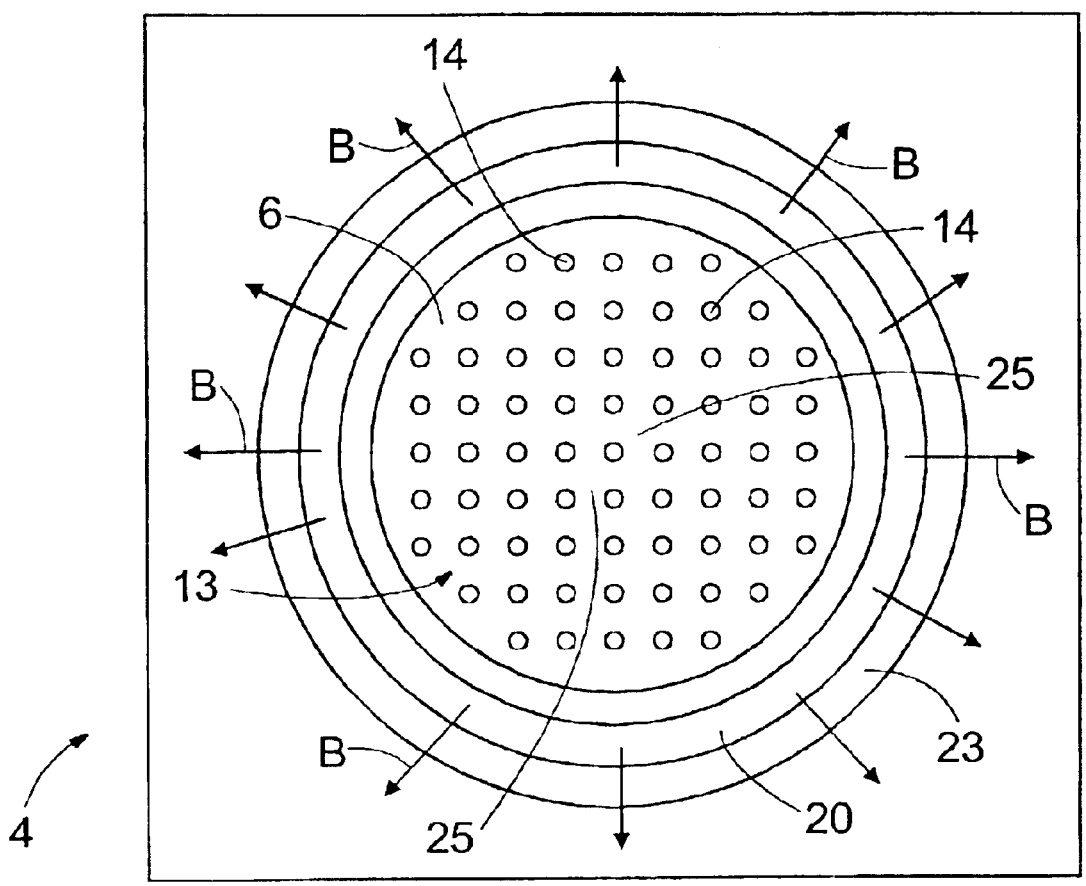
FIG. 7 schematically illustrates the measuring head of a fourth measuring device according to the invention, seen from the direction of the web.

FIG. 7 schematically illustrates the second measuring head 4 of a fourth measuring device 1 according to the invention, seen from the direction of the web. In the second measuring head 4 according to FIG. 7, holes 14 are formed in the reference part 6 in such a way that the holes 14 form in the reference part 6 a hole pattern that extends substantially evenly in the direction of the web level, the holes 14 being positioned at substantially the same distances from each other in the hole pattern. In connection with the reference part 6 shown in FIG. 7, the measuring area 25 can be any area between the holes 14, whereby the distance between the first measuring head 3 and the moving web 2 can be measured at the point in question, for example by means of the measuring beam 11 of the laser 8 described above. The position changes between the reference part 6 and the first measuring head 3 or support element 12 can be compensated for in the manner described earlier, although the reference part 6 comprises no special measuring areas without holes 14. In some cases, it has been observed that the hole pattern of FIG. 7, which extends evenly in the direction of the web level, eliminates measuring interferences relating to induction measuring better than for instance the hole pattern of FIG. 3, where the reference part 6 comprises special measuring surfaces 26 without holes.

The drawings and the related description are only intended to illustrate the idea of the invention. The details of the invention may vary within the scope of the claims. In FIGS. 1 to 6, the reference part 6 is annular, and the nozzle opening 20 is arranged to extend around the whole reference part 6. However, the appearance of the reference part 6 can vary, in other words it may be for instance of the shape of a square or a rectangle. Irrespective of the appearance of the reference part 6, the nozzle opening 20 can be arranged either partly or as a whole to surround the reference part 6. The reference part 6 can also be arranged at the first measuring head 3, instead of at the second measuring head 4, in which case measuring means required for the measurement of the web thickness can be arranged at the second measuring head 4. Further, the solution according to the invention can also be used in measuring devices that measure other properties of the web, in which devices it is preferable to support the web against the reference surface to achieve an accurate measurement result. Such properties include the color, gloss or roughness of the web. Further, it may be the case that the measuring device has only one measuring head, which comprises both a reference part and measuring means that measure a property of the web, whereby the measuring means are arranged to measure properties of the web supported against the reference surface of the reference part through measuring openings formed through the reference part; thus, also the measuring area 25 could be implemented as a measuring opening. A measuring device of this type could be used for instance to optically measure the moisture of a moving web. Further, a special reference part 6 is not necessary, but the reference surface 13 can also be formed directly for instance on the side of the moving web in the frame structure 15 of the second measuring head 4. In this case, when a vacuum pump 31 is used, several channels 33 could be arranged, modifying the embodiment of FIG. 6, directly in the holes formed through the reference surface 13, in which case an open space 17 below the reference surface 13 would not be necessary either. Instead of a paper web 2 or a board, a tissue or a pulp web, the moving web can be a web of a different type, such as a plastic-film or a textile web.

What is claimed is:

1. A method of measuring at least one property of a moving web, the method comprising the steps of measuring the property of the moving web with a measuring device having at least one measuring head with a reference part, supporting the moving web against a reference surface of the reference part and measuring the property of the moving web within a measuring area of the reference surface, wherein the reference part is arranged in connection with the measuring head in such a way that below the reference part there is a substantially open air space, and the reference part comprises holes formed through it, wherein the measuring head comprises at least one channel being in connection with the open air space below the reference part, the method further comprising supplying gaseous medium, through the at least one channel, between the measuring head and the moving web, so as to generate negative pressure in the open air space, which negative pressure is exerted on the web through the reference part in such a way that the negative pressure affects the moving web at different distances from the measuring area along the surface of the web such that the negative pressure causes the moving web to be supported against the reference surface substantially over the whole area of the measuring area.

2. A method according to claim 1, wherein negative pressure is generated between the moving web and the reference surface through the reference part in such a way that due to the effect of the negative pressure, the moving web is supported against the reference surface substantially over the whole area of the reference surface.

3. A method according to claim 1, wherein the channel for supplying a gaseous medium between the measuring head and the moving web comprises a nozzle opening between the reference part and the frame structure of the measuring head or a form element arranged in it, whereby the gaseous medium is supplied from the nozzle opening along the edges of the frame structure of the measuring head or a form element arranged in it.

4. A method according to claim 3, wherein the frame structure of the measuring head or the form element arranged in it comprises a curved control surface for turning the flow of the gaseous medium to flow between the measuring head and the moving web.

5. A method according to claim 1, wherein the gaseous medium is air.

6. A method according to claim 1, wherein the negative pressure in the air space is measured and the negative pressure of the air space is changed on the basis of the measurement information on the negative pressure of the air space.

7. A method according to claim 1, wherein the negative pressure between the reference surface and the moving web is 80 to 99% of the pressure of the ambient air.

8. A method according to claim 1, wherein the measuring device comprises a first measuring head and a second measuring head, between which there is an air gap where the moving web is arranged to travel, and the reference part is arranged at the second measuring head.

9. A method according to claim 8, wherein the distance between the first measuring head and the reference surface of the reference part is measured inductively.

10. A method according to claim 9, wherein the measuring head is arranged to measure the thickness of the moving web.

11. A method according to claim 1, wherein the moving web is a paper web, a board web, a tissue web or a pulp web.

12. A method of measuring at least one property of a moving web, the method comprising the steps of measuring the property of the moving web with a measuring device having at least one measuring head with a reference part, supporting the moving web against a reference surface of the reference part and measuring the property of the moving web within a measuring area of the reference surface, and generating negative pressure through the reference part in such a way that the negative pressure affects the moving web at different distances from the measuring area along the surface of the web such that the negative pressure causes the moving web to be supported against the reference surface substantially over the whole area of the measuring area, wherein at least one property of the moving web is measured optically.

13. A method according to claim 12, wherein the property of the moving web to be measured is the color, gloss, roughness or moisture of the moving web.

14. A measuring device for measuring at least one property of a moving web, the measuring device having at least one measuring head with a reference part, the reference part having a reference surface against which the moving web is arranged to be supported to measure the property of the web and the reference surface comprising a measuring area within which measuring area the property of the web is arranged to be measured, whereby the reference part is arranged in connection with the measuring head in such a way that below the reference part, there is substantially open air space, wherein the measuring head comprises at least one channel which is in connection with the open air space below the reference part and which is arranged to supply a gaseous medium between the measuring head and the moving web in such a way that the supply of the gaseous medium is arranged to generate negative pressure in the air space, the reference part comprising holes formed therethrough at different distances from the measuring area such that the negative pressure generated in the air space is arranged to affect, through the holes formed through the reference part, between the reference surface and the moving web in such a way that due to the effect of the negative pressure, the moving web is supported against the reference surface substantially over the whole area of the measuring area.

15. A measuring device according to claim 14, wherein the reference part comprises holes formed through it in such a way that the negative pressure to be generated in the air space is arranged to affect, through the holes formed through the reference part, the space between the reference part and the moving web in such a way that due to the effect of the negative pressure, the moving web is arranged to be supported against the reference surface substantially over the whole area of the reference surface.

16. A measuring device according to claim 14, wherein the channel for supplying the gaseous medium between the measuring head and the moving web comprises a nozzle opening between the reference part and the frame structure of the measuring head or a form element arranged in it in such a way that the gaseous medium is arranged to be supplied from the nozzle opening to the space between the measuring head and the moving web along the edges of the frame structure of the measuring head or the form element arranged in it.

17. A measuring device according to claim 16, wherein in that the frame structure of the measuring head or the form element arranged in it comprises a curved control surface for turning the flow of the gaseous medium to flow to the space between the measuring head and the moving web.

18. A measuring device according to claim 14, wherein the lower surface of the reference part comprises two air channels substantially parallel relative to the direction of travel of the web to supply a gaseous medium between the measuring head and the moving web substantially in parallel relative to the direction of travel of the moving web.

19. A measuring device according to claim 14, wherein the gaseous medium is air.

20. A measuring device according to claim 14, wherein the measuring head comprises a vacuum pump for generating negative pressure in the open air space below the reference part and further through the holes of the reference part between the reference surface and the moving web.

21. A measuring device according to claim 14, wherein the reference part is substantially plate-like.

22. A measuring device according to claim 14, wherein the reference part is made of a material that conducts electricity well.

23. A measuring device according to claim 14, wherein a negative-pressure sensor is arranged in the air space for measuring the negative pressure prevailing in the air space and that the feed pressure of the gaseous medium or the use of the vacuum pump is arranged to be changed on the basis of the measurement information of the negative pressure of the air space.

24. A measuring device according to claim 14, wherein the negative pressure between the reference surface and the moving web is 80 to 99% of the ambient air pressure.

25. A measuring device according to claim 14, wherein the measuring head comprises a first measuring head and a second measuring head, between which there is an air gap where the moving web is arranged to travel, and that the reference part is arranged at the second measuring head.

26. A measuring device according to claim 25, wherein the first measuring head comprises at least one electromagnetic measuring means for determining the distance between the first measuring head and the reference surface of the reference part.

27. A measuring device according to claim 26, wherein the electromagnetic measuring means is a coil.

28. A measuring device according to claim 26, wherein the measuring device is arranged to measure the thickness of the moving web.

29. A measuring device according to claim 14, wherein the moving web is a paper web, a board web, a tissue web or a pulp web.

30. A measuring device for measuring at least one property of a moving web, the measuring device having at least one measuring head with a reference part, the reference part having a reference surface against which the moving web is arranged to be supported to measure the property of the web and the reference surface comprising a measuring area within which measuring area the property of the web is arranged to be measured, whereby the reference part is arranged in connection with the measuring head in such a way that below the reference part, there is substantially open air space, the measuring device comprising means for generating a negative pressure in the air space, the reference part comprising holes formed therethrough at different distances from the measuring area such that the negative pressure generated in the air space is arranged to affect, through the holes formed through the reference part, between the reference surface and the moving web in such a way that due to the effect of the negative pressure, the moving web is supported against the reference surface substantially over the whole area of the measuring area, wherein the measuring head comprises at least one optical measuring means for measuring a variable expressing at least one property of the moving web.

31. A measuring device according to claim 30, wherein the measuring means is a laser.

32. A measuring device according to claim 30, wherein the property of the moving web to be measured is the color, gloss, roughness or moisture of the moving web.

* * * * *